(12) United States Patent
Lee et al.

(10) Patent No.: US 11,990,634 B1
(45) Date of Patent: May 21, 2024

(54) BATTERY PACK MOUNTING STRUCTURE OF VEHICLE

(71) Applicants: Hyundai Motor Company, Seoul (KR); Kia Corporation, Seoul (KR)

(72) Inventors: Won Hae Lee, Seoul (KR); Nam Ho Kim, Gwangmyeong-si (KR); Jun Woo Park, Hwaseong-si (KR); Seung Min Jeong, Hwaseong-si (KR); Eun Bi Kim, Seoul (KR); Sun Keun Park, Seoul (KR); Byung Joo Chung, Gunpo-si (KR); Seung Hak Lee, Asan-si (KR); Jeong Hoon Han, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/195,489

(22) Filed: May 10, 2023

(30) Foreign Application Priority Data

Nov. 29, 2022 (KR) .................. 10-2022-0162851

(51) Int. Cl.
*H01M 50/249* (2021.01)
*B60R 16/04* (2006.01)
*H01M 50/244* (2021.01)

(52) U.S. Cl.
CPC .......... *H01M 50/249* (2021.01); *B60R 16/04* (2013.01); *H01M 50/244* (2021.01); *H01M 2220/20* (2013.01)

(58) Field of Classification Search
CPC ......... B60R 16/04; B60R 19/02; B60R 19/56; B60R 2019/026; B60R 2019/1806

USPC .......................................... 293/102
See application file for complete search history.

(56) References Cited

U.S. PATENT DOCUMENTS

| | | | | |
|---|---|---|---|---|
| 5,501,289 | A * | 3/1996 | Nishikawa | B60K 1/04 280/783 |
| 6,227,322 | B1 * | 5/2001 | Nishikawa | B60R 16/04 180/68.5 |
| 9,227,582 | B2 * | 1/2016 | Katayama | H01M 50/24 |
| 11,524,606 | B2 * | 12/2022 | Lee | B62D 25/20 |
| 2012/0301765 | A1 * | 11/2012 | Loo | H01M 50/224 429/100 |

(Continued)

FOREIGN PATENT DOCUMENTS

KR 10-2014-0045778 A 4/2014

*Primary Examiner* — Amy R Weisberg
*Assistant Examiner* — Veronica M Shull
(74) *Attorney, Agent, or Firm* — Morgan, Lewis & Bockius LLP

(57) ABSTRACT

A battery pack mounting structure of a vehicle includes: a frame side member of a chassis frame provided so that an upper end portion thereof is located at a position spaced downward by a predetermined reference downward distance from a step height set in consideration of ease of boarding of passengers; a battery case provided so that a battery accommodated in the battery case overlaps the frame side member in a horizontal direction thereof; a case side portion forming a side surface of the battery case, coupled to a lower side of the frame side member, and including a lower end portion aligned with a lowest ground height of the vehicle; and a case lower plate forming the battery case while supporting a lower side of the battery and disposed at a position spaced upwards from the lowest ground height.

20 Claims, 6 Drawing Sheets

(56) References Cited

U.S. PATENT DOCUMENTS

2019/0382051 A1* 12/2019 Toyota .................. B62D 25/02
2023/0223635 A1*  7/2023 Jeong .................. H01M 50/262
                                                              429/99

* cited by examiner

BATTERY PACK MOUNTING STRUCTURE OF VEHICLE

CROSS-REFERENCE TO RELATED APPLICATION(S)

The present application claims priority to Korean Patent Application No. 10-2022-0162851, filed on Nov. 29, 2022, the entire contents of which is incorporated herein for all purposes by this reference.

BACKGROUND OF THE PRESENT DISCLOSURE

Field of the Present Disclosure

The present disclosure relates to technique for mounting a battery pack required for an electric vehicle or the like in a vehicle.

Description of Related Art

A vehicle having a body-on-frame structure means a vehicle that has a structure in which a vehicle body is mounted on the upper side of a chassis frame, especially, the chassis frame including chassis components necessary for driving the vehicle is used in common, and a vehicle body mounted on the upper side of the chassis frame is configured to be easily mounted in various states desired by consumers.

When an electric vehicle takes the body-on-frame structure described above, a battery pack is preferably provided on the chassis frame side thereof.

The battery pack generally includes a battery module made of battery cells and a battery case configured to enclose a plurality of battery modules to protect and support the battery modules.

Hereinafter, the term "battery" simply means a battery cell or a battery module in a battery case.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery pack mounting structure of a vehicle which is configured, in a vehicle including a body-on-frame structure, or the like, to ensure easy boarding/alighting of passengers while effectively protecting a battery necessary for driving the vehicle, and to secure as much space for a passenger compartment as possible, securing the safety of a mounted battery and greatly enhancing the marketability of the vehicle.

In view of the foregoing, a battery mounting structure of a vehicle of the present disclosure may include: a frame side member of a chassis frame provided so that an upper end portion thereof is located at a position spaced downward by a predetermined reference downward distance from a step height set in consideration of ease of boarding of passengers; a battery case provided so that a battery accommodated in the battery case overlaps the frame side member in a horizontal direction thereof; a case side portion forming a side surface of the battery case, coupled to a lower side of the frame side member, and including a lower end portion aligned with a lowest ground height of the vehicle; and a case lower plate forming the battery case while supporting a lower side of the battery and disposed at a position spaced upwards from the lowest ground height.

The predetermined reference downward distance may correspond to a sum of a thickness of a body floor in the vehicle, of which the upper end portion thereof is aligned with the step height, and a vehicle body clearance formed between the body floor and the frame side member.

The case side portion may include: a vertical cross-sectional portion, which is a cross section extending in an up and down direction and forms the side surface of the battery case; and a horizontal cross-sectional portion, which is a cross section extending from the vertical cross-sectional portion in a transverse direction of the vehicle to be perpendicular to the vertical cross-sectional portion and is coupled to the lower side of the frame side member.

The horizontal cross-sectional portion of the case side portion may have a lower end portion aligned with the lowest ground height.

The lower end portion of the horizontal cross-sectional portion of the case side portion may have a structure horizontally connected to an inclined connection portion extending obliquely downwardly from the lower end portion of the vertical cross-sectional portion.

The frame side member may be provided so that the lower end portion thereof is located at a position obtained by adding the lowest ground height and the height of the horizontal cross-sectional portion of the case side portion from the ground.

The frame side member may include a frame recess in which a portion to which the case side portion is coupled is locally recessed upward in a longitudinal direction of the vehicle.

A vehicle body side sill of a vehicle body provided on an upper side of the frame side member may have a lower end portion aligned with the lowest ground height.

The battery case may include a lower cover on a lower side of the case lower plate, and the lower cover may be aligned with the lowest ground height.

In view of the foregoing, a battery mounting structure of a vehicle of the present disclosure may include: a frame side member of a chassis frame provided so that an upper end portion thereof is located at a position spaced downward by a predetermined reference downward distance from a step height of the vehicle and a lower end portion thereof is located at a position spaced upward by a predetermined reference upward distance from a lowest ground height of the vehicle; a battery disposed to overlap the frame side member in a horizontal direction; and a battery case enclosing the battery, mounted on the frame side member, and including a lower end portion aligned with the lowest ground height.

The battery case may include: a case lower plate supporting a lower side of the battery; a cooling plate provided on a lower side of the case lower plate; a lower cover enclosing a lower side of the cooling plate; an upper cover enclosing an upper side of the battery; and a case side portion coupled between the case lower plate and the upper cover and forming a side surface of the battery case.

The lower cover of the battery case may be aligned with the lowest ground height.

The case side portion may include: a vertical cross-sectional portion provided between the case lower plate and the upper cover to have a cross-sectional shape extending in an up and down direction thereof; and a horizontal cross-sectional portion protruding from the vertical cross-sectional portion in a transverse direction of the vehicle.

The lower end portion of the horizontal cross-section of the case side portion may have a structure horizontally connected to an inclined connection portion inclined downwardly from the vertical cross-sectional portion, and may be aligned with the lowest ground height.

The predetermined reference upward distance may be provided by the height of the horizontal cross-sectional portion of the case side portion.

The predetermined reference downward distance may correspond to a sum of a thickness of a body floor in the vehicle, of which the upper end portion is aligned with the step height, and a vehicle body clearance formed between the body floor and the frame side member.

The frame side member may extend in a longitudinal direction of the vehicle, and the lower side of a portion to which the case side portion of the battery case is coupled may be recessed upward to provide a frame recess, so that the lower end portion of the case side portion of the battery case coupled to the frame recess may be configured to be aligned with the lowest ground height.

According to an exemplary embodiment of the present disclosure, the battery pack mounting structure of a vehicle is configured, in a vehicle including a body-on-frame structure, or the like, to ensure the ease of boarding/alighting of passengers while effectively protecting a battery necessary for driving the vehicle, and to secure as much space for a passenger compartment as possible. As a result, it is possible to secure the safety of a mounted battery and greatly enhance the marketability of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
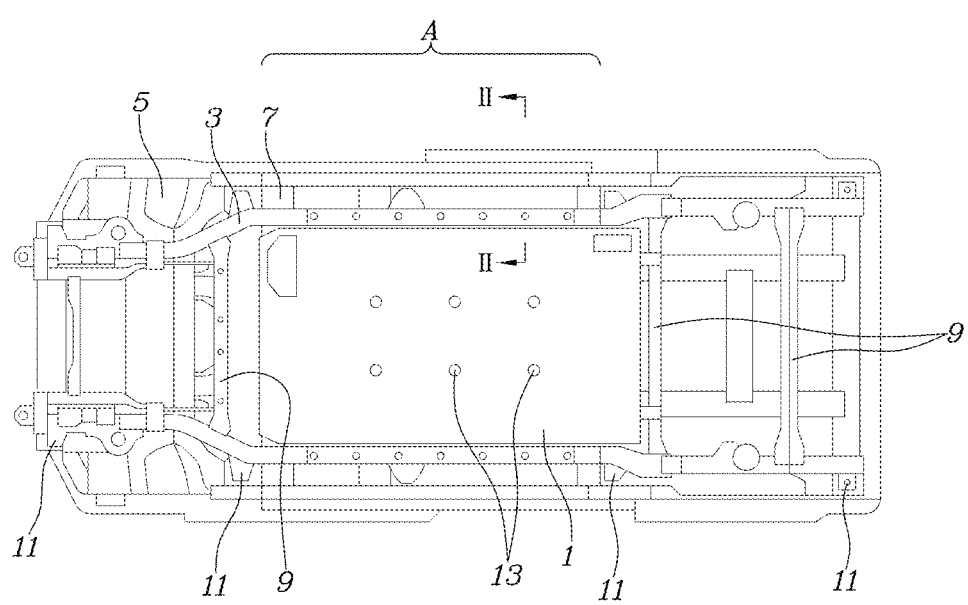
FIG. 1 is a view exemplarily illustrating an example in which a battery pack mounting structure of a vehicle according to an exemplary embodiment of the present disclosure is applied, and illustrating a view obtained by observing, in which the state in which a chassis frame, and the battery pack is mounted on the lower side of the vehicle body is illustrated.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings, and the same or similar elements are provided the same and similar reference numerals, so duplicate descriptions thereof will be omitted.

The terms "module" and "unit" used for the elements in the following description are provided or interchangeably used in consideration of only the ease of writing the specification, and do not have distinct meanings or roles by themselves.

In describing the exemplary embodiments included in the present specification, when the detailed description of the relevant known technology is determined to unnecessarily obscure the gist of the present disclosure, the detailed description may be omitted. Furthermore, the accompanying drawings are provided only for easy understanding of the exemplary embodiments included in the present specification, and the technical spirit included herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

FIG. 1 is a view exemplarily illustrating an example in which a battery pack 1 mounting structure of a vehicle according to an exemplary embodiment of the present disclosure is applied, and illustrating a view obtained by observing, from the lower side of the vehicle, the state in which a vehicle body 5 is coupled to the upper side of a chassis frame 3, and the battery pack 1 is mounted on the chassis frame 3 in the center portion of the vehicle body 5.

The chassis frame 3 includes frame side members 7 disposed on opposite sides of the vehicle to extend in a front and rear direction, and a plurality of frame cross members 9 interconnecting the two frame side members 7 in the transverse direction of the vehicle.

The vehicle body 5 is located on the upper side of the chassis frame 3, and as illustrated, the chassis frame 3 and the vehicle body 5 are coupled to each other by a plurality of vehicle body mounting portions 11.

The vehicle body 5 mounted on the upper side of the chassis frame 3 may be configured in various shapes to meet the needs of consumers.

As will be described later, the opposite sides of the battery pack 1 may be coupled to the frame side members 7 of the chassis frame 3, and may be securely coupled to the vehicle body 5 by a plurality of battery penetration bolts 13 penetrating the center portion of the battery pack 1 and coupled to the vehicle body 5.

The battery pack mounting structure of the present disclosure to be described hereinbelow relates to section A in FIG. 1.

For reference, hereinafter, with respect to the battery pack mounting structure of the vehicle of the present disclosure, a part explained mainly by paying attention to a horizontal arrangement relationship of components, a part explained mainly by paying attention to a vertical arrangement relationship of components, a part explained mainly by paying attention to a structure of a battery case, and a part explained mainly by paying attention to a structure of the frame side members will be described in turn.

Accordingly, redundant descriptions may be made for some components.

Figure 2:
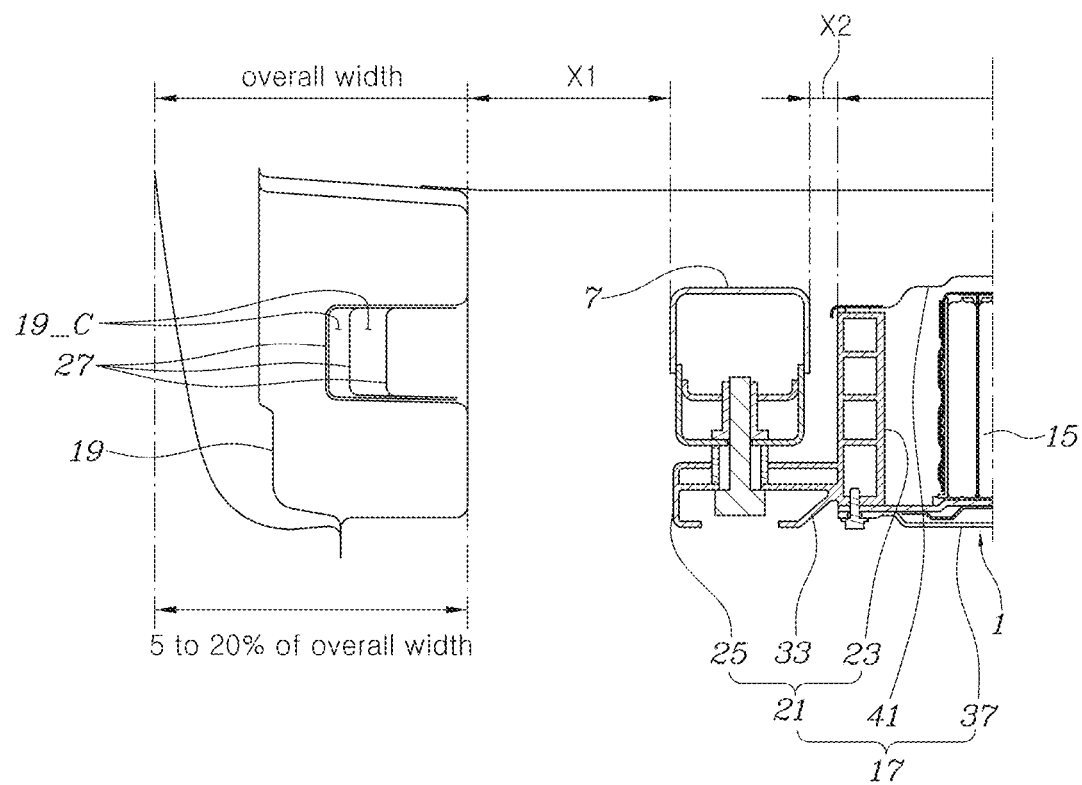
FIG. 2 is a cross-sectional view taken along line II-II of FIG. 1, in which a horizontal arrangement relationship of components is illustrated.

FIG. 2 mainly illustrates the horizontal arrangement relationship of components forming the battery pack mounting structure of the vehicle of the present disclosure. The structure of the present exemplary embodiment includes: frame side members 7 forming a chassis frame 3 and disposed on opposite sides of the vehicle to extend in the front and rear direction thereof; a battery 15 disposed inside the two frame side members 7 to overlap the two frame side members 7 in a horizontal direction thereof; a battery case 17 enclosing the battery 15 and fastened to lower sides of the frame side members 7; vehicle body side sills 19 disposed to overlap the external sides of the frame side members 7 in the horizontal direction thereof.

That is, the battery 15 is disposed between the opposite frame side members 7 to overlap the frame side members 7 in the horizontally direction in the state of being enclosed in the battery case 17, and the vehicle body side sills 19 are disposed outside the frame side members 7 to overlap the frame side members 7 in the horizontal direction thereof. Consequently, the vehicle body side sills 19, the frame side members 7, and the battery 15 are disposed to overlap each other in the horizontal direction thereof.

From the point of view of the battery 15, this is a configuration in which the vehicle body side sills 19 and the frame side members 7 protect the battery 15 in multiple ways against an impact applied in the horizontal direction from the outside of the vehicle.

The vehicle body side sills 19 are spaced from the frame side members 7 by a vehicle body deformation section X1 which is provided so that the vehicle body side sills 19 are deformable without coming into contact with the frame side members 7 when an external impact is applied.

Furthermore, a plurality of closed cross sections 19_C are provided inside each vehicle body side sill 19 to absorb an impact and suppress deformation when an external impact is applied.

Therefore, when an external impact is applied to the vehicle, for a predetermined amount of impact, the vehicle body side sills 19 absorb the impact on their own while suppressing deformation, and for a larger impact, the vehicle body side sills 19 are deformed and pushed into the vehicle body deformation section X1 to absorb the impact energy. Thus, the external impact is prevented from being transmitted to the frame side members 7 and the battery 15 as much as possible.

To ensure impact resistance and shock absorption function as described above, the width from the interior of the vehicle body side sills 19 to the external contour of the vehicle body 5 is set to 5 to 20% of the overall width of the vehicle.

Furthermore, the vehicle body deformation section X1 is set to 60% or more of the width of the vehicle body side sills 19 or 40 to 60% of the distance from the vehicle body side sills 19 to the battery 15.

That is, as described above, the vehicle body deformation section X1 needs to be set to the width described above in order to ensure that the vehicle body side sill 19 exerts a sufficient shock absorption function while being deformed and pushed into the vehicle.

Meanwhile, the battery case 17 includes a case side portion 21 forming corresponding one of the side surfaces of the battery case 17. The case side portion 21 includes: a vertical cross-sectional portion 23, which is a cross section provided to extend in an up and down direction and forms a side surface of the battery case 17; and a horizontal cross-sectional portion 25, which is a cross-sectional portion protruding and extending in a transverse direction of the vehicle to be perpendicular to the vertical cross-sectional portion 23 and is coupled to the lower side of a corresponding one of the frame side members 7.

Here, the frame side member 7 is spaced from the vertical cross-sectional portion 23 of the case side portion 21 by a frame deformation section provided so that the frame side member 7 may be deformed without coming into contact with the vertical cross-sectional portion 23 of the case side portion 21 when an external impact occurs.

That is, the case side portion 21 including an L-shaped cross section forms each of the opposite sides of the battery case 17, and a laterally protruding portion of the case side portion 21 is coupled to the lower side of the corresponding frame side member 7 so that the upwardly protruding cross-sectional portion of the case side portion 21 is in the state of being horizontally spaced from the frame side member 7 by a frame deformation section X2.

Therefore, each frame side member 7 is spaced from a corresponding one of the vehicle body side sills 19 by the vehicle body deformation section X1 toward the outside of the vehicle, and is spaced from the vertical cross-sectional portion 23 of the case side portion 21 by the frame deformation section X2 toward the interior of the vehicle.

The frame deformation section X2 is configured to allow the vehicle body side sills 19 to be deformed by an impact applied from the outside of the vehicle and transmitted to the frame side members 7, and is configured to prevent the impact from being transmitted to the battery 15 when the frame side members 7 are deformed within the frame deformation section X2 even if the frame side members 7 are also deformed.

Furthermore, the frame deformation section X2 is also configured to facilitate assembly when assembling the battery pack 1 to be substantially coupled to the chassis frame 3.

The configuration of the above-described embodiment of the present disclosure may be expressed as follows.

That is, the battery pack mounting structure of the vehicle according to an exemplary embodiment of the present disclosure includes: frame side members 7 disposed on opposite sides of the vehicle to extend in the front and rear direction and form a chassis frame 3; vehicle body side sills 19 spaced from the frame side members 7 by a predetermined vehicle body deformation section X1 toward the outside of the vehicle; and a battery case 17 including vertical cross-sectional portions 23 spaced from the frame side members 7 by a predetermined frame deformation section X2 toward the interior of the vehicle and incorporating a battery 15 therein.

The frame side members 7 and the vehicle body side sills 19 are disposed on the opposite sides of the vehicle to overlap in the horizontal direction with the battery case 17 as the center.

The battery case 17 includes a case side portion 21 forming a side surface thereof including the vertical cross-sectional portion 23, the case side portion 21 includes a horizontal cross-section portion 25 protruding and extending from the lower side of the vertical cross-section portion 23 in the transverse direction of the vehicle, and the horizontal cross-sectional portion 25 is configured to be coupled to the lower end portion of a corresponding one of the frame side members 7.

Inside the vehicle body side sills 19, side sill reinforcing panels 27 each forming at least one closed cross section 19_C are provided to absorb an impact and suppress deformation when an external impact is applied.

Figure 3:
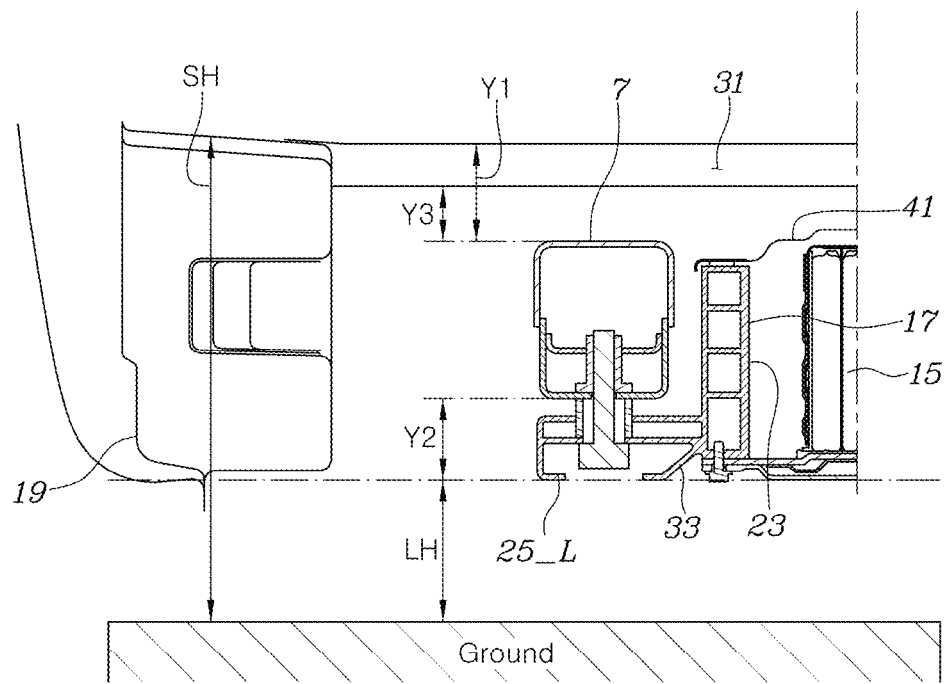
FIG. 3 is a cross-sectional view taken along line II-II of FIG. 1, in which a vertical arrangement relationship of components is illustrated.

FIG. 3 mainly illustrates a vertical arrangement relationship of the components of a battery pack mounting structure of a vehicle according to an exemplary embodiment of the present disclosure. The structure of the present exemplary embodiment includes: a frame side member 7 of a chassis frame 3 which is provided so that an upper end portion thereof is located at a position spaced downward by a predetermined reference downward distance Y1 from a step height SH set in consideration of the ease of boarding of passengers; a battery case 17 in which a battery 15 accommodated therein is provided to overlap the frame side member 7 in a horizontal direction thereof; a case side portion 21 forming a side surface of the battery case 17, coupled to the lower side of the frame side member 7, and including a lower end portion aligned with the lowest ground height LH of the vehicle; and a case lower plate 29, which forms the battery case 17 while supporting the lower side of the battery 15 and is disposed at a position spaced upwards from the lowest ground height LH.

Here, the step height SH is a height of a vehicle that ordinary people are configured for boarding the vehicle on their own without using another mechanism or the like, and is set as low as possible for easy vehicle boarding.

Furthermore, the lowest ground height LH of the vehicle is set to a minimum height that must be separated from the ground to protect the lower portion of the vehicle and the battery in consideration of the state of the roads on which the vehicle mainly travels.

Here, the frame side member 7 and the battery case 17 are disposed between the lowest ground height LH and the step height SH. The frame side member 7 is disposed below the step height SH by a reference downward distance Y1, and the lower end portion of the battery case 17 is aligned with the lowest ground height LH.

Here, the reference downward distance Y1 includes the thickness of a body floor 31, of which the upper end portion is aligned with the step height SH, and a vehicle body clearance Y3 formed between the body floor 31 and the frame side member 7.

For example, the body floor 31 is provided with a thickness of about 25 mm to provide rigidity required by the vehicle, and the body clearance Y3 may be set to 5 to 15 mm to play a role such as avoiding interference between components, which occurs during the production and maintenance of the vehicle.

On the other hand, the case side portion 21 forming the battery case 17 includes: a vertical cross-sectional portion 23, which is a cross section extending in the up and down direction and forms a side surface of the battery case 17; a horizontal cross-sectional portion 25, which is a cross section extending and protruding in the transverse direction of the vehicle to be perpendicular to the vertical cross-sectional portion 23 and is coupled to the lower side of the frame side member 7, wherein the lower end portion 25_L of the horizontal cross-sectional portion 25 is aligned with the lowest ground height H.

Because the lower end portion 25_L of the horizontal cross-sectional portion 25 of the case side portion 21 has a structure horizontally connected to an inclined connection portion 33 extending obliquely downwardly from the lower end portion of the vertical cross-sectional portion 23, the lower end portion 25_L of the horizontal cross-sectional portion 25 may be aligned with the lowest ground height LH at a lower side than the vertical cross-sectional portion 23.

Therefore, it may be seen that the frame side member 7 is provided so that the lower end portion thereof is located at a position obtained by adding the lowest ground height LH and the height of the horizontal cross-sectional portion 25 of the case side portion 21 from the ground.

The frame side member 7 includes a frame recess 35 in which a portion to which the case side portion 21 is coupled is locally recessed upward in the longitudinal direction of the vehicle.

Figure 4:
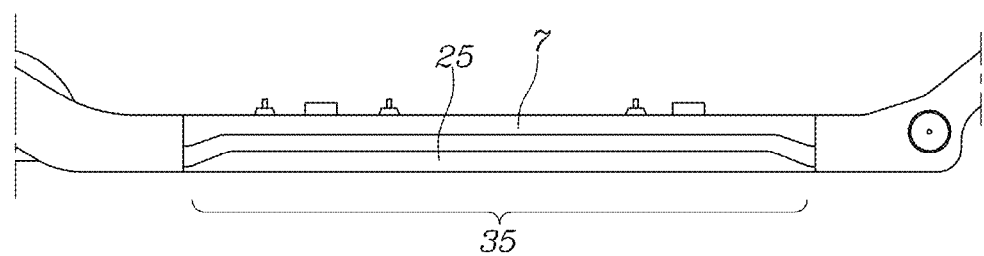
FIG. 4 is a view obtained by viewing part A of FIG. 1 from a side.

That is, as illustrated in FIG. 4, the frame recess 35 is recessed upward in the lower side of the frame side member 7, and the horizontal cross-sectional portion 25 of the case side portion 21 is coupled to the frame recess 35.

Therefore, even when the horizontal cross-sectional portion 25 of the battery case 17 is coupled to the lower side of the frame side member 7, the lowest ground height LH of the vehicle is not substantially decreased.

In the configuration of the present disclosure described above, due to the structure in which the battery 15 is disposed at substantially the same height as the frame side member 7 to overlap the frame side member 7 in the horizontal direction, and the horizontal cross-sectional portion 25 of the battery case 17 is coupled to the frame recess 35 of the frame side member 7, it is possible to minimize an unnecessary space according to the mounting of the battery pack 1 in the vehicle to minimize the distance from the lowest ground height LS to the step height. Thus, due to the compact battery pack 1 mounting structure of the vehicle, it is consequently possible to lower the step height SH, and thus it is possible to secure the ease of boarding of passengers in the vehicle and to accommodate shapes according to more diverse utilizes of the vehicle body coupled to the upper side of the chassis frame 3.

Meanwhile, the lower end portion of the vehicle body side sill 19 of the vehicle body 5 provided on the upper side of the frame side member 7 is aligned with the lowest ground height LH.

That is, the vehicle body 5 is mounted on the upper side of the chassis frame 3 including the frame side member 7, and the vehicle body side sill 19 forming a portion of the vehicle body 5 is spaced outwardly from the frame side member 7 with the vehicle body deformation section X1 interposed therebetween as described above. The lower end portion of the vehicle body side sill 19 is also aligned with the lowest ground height LH.

Meanwhile, the battery case 17 is provided with a lower cover 37 on the lower side of the case lower plate 29, and the lower cover 37 is aligned with the lowest ground height LH.

Accordingly, the lower end portion of the vehicle body side sill 19, the lower end portion of the horizontal cross-sectional portion 25 of the case side portion 21, and the lower cover 37 are all disposed to be aligned with the lowest ground height LH.

The configuration of the above-described embodiment of the present disclosure may be expressed as follows.

That is, the battery pack mounting structure of the vehicle of the present disclosure includes: a frame side member 7 of a chassis frame 3 including an upper end portion located at a position spaced downwardly from the step height SH of the vehicle by a predetermined reference downward distance Y1 and a lower end portion located at a position spaced from the lowest vehicle height LH of the vehicle by a predetermined reference upward distance Y2; a battery 15 disposed to overlap the frame side member 7 in the horizontal direction thereof; and a battery case 17 enclosing the battery 15, mounted on the frame side member 7, and including a lower end portion aligned with the lowest ground height LH.

The battery case 17 includes: a case lower plate 29 supporting the lower side of the battery 15; a cooling plate 39 provided on the loser side of the case lower plate 29; a lower cover 37 covering the lower side of the cooling plate 39; an upper cover 41 surrounding the upper side of the battery; and a case side portion 21 coupled between the case lower plate 29 and the upper cover 41 and forming a side surface of the battery case 17.

The lower cover 37 of the battery case 17 is aligned with the lowest ground height LH.

Furthermore, the case side portion 21 includes: a vertical cross-sectional portion 23 provided in a cross-sectional shape extending in the vertical direction between the case lower plate 29 and the upper cover 41; and a horizontal cross-sectional portion 25 protruding from the vertical cross-sectional portion 23 in the transverse direction of the vehicle.

The lower end portion of the horizontal cross-sectional portion 25 of the case side portion 21 has a structure horizontally connected to an inclined connection portion 33 which is inclined downwardly from the vertical cross-sectional portion 23, and is aligned with the lowest ground height LH.

The reference upward distance Y2 is the height of the horizontal cross-sectional portion 25 of the case side portion 21.

Furthermore, the reference downward distance Y1 is the sum of the thickness of a body floor 31 of which the upper end portion is aligned with the step height SH and a vehicle body clearance Y3 formed between the body floor 31 and the frame side member 7.

The frame side member 7 is provided to extend in the longitudinal direction of the vehicle, and includes a frame recess 35 in which the lower side of the portion to which the case side portion 21 of the battery case 17 is coupled is recessed upwards. The lower end portion of the case side portion 21 of the battery case 17 coupled to the frame recess 35 is configured to be aligned with the lowest ground height LH.

Figure 5:
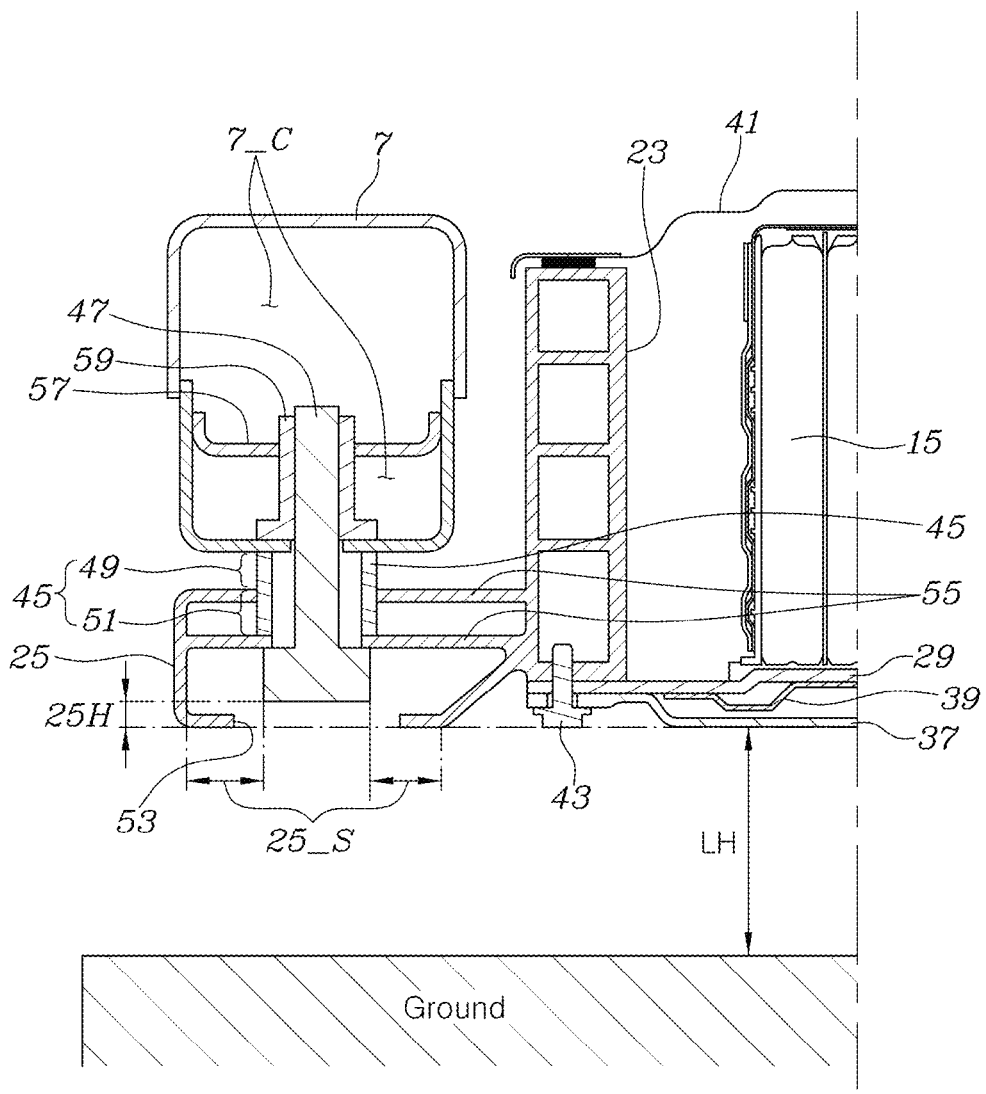
FIG. 5 is a cross-sectional view taken along line II-II of FIG. 1, in which a structure of a battery case is illustrated.

FIG. 5 mainly illustrates the structure of the battery case 17 forming the battery pack 1 mounting structure of the vehicle of the present disclosure. The structure of the present exemplary embodiment includes: a frame side member 7 forming a chassis frame 3 and disposed on each of the opposite sides of the vehicle to extend in the front and rear direction thereof; a battery 15 disposed inside the frame side member 7 to overlap the frame side member in the horizontal direction thereof; and a battery case 17 enclosing the battery 15. The case side portion 21 provided on each side of the battery case 17 is coupled to the lower side of the frame side member 7.

The battery case 17 includes: an upper cover 41 enclosing the upper side of the battery 15; and a case lower plate 29 supporting the lower side of the battery 15.

The case side portion 21 includes: a vertical cross-sectional portion 23 coupled between the case lower plate 29 and the upper cover 41 and including a cross section extending in the up and down direction thereof; and a horizontal cross-sectional portion 25 protruding and extending from the vertical cross-sectional portion 23 in the transverse direction of the vehicle and coupled to the lower side of the frame side member 7.

That is, in the case side portion 21, the horizontal cross-sectional portion 25 is coupled to the lower side of the frame side member 7, and the vertical cross-sectional portion 23 is disposed inside the frame side member 7.

Furthermore, in the battery case 17, a cooling plate 39 is provided on the lower side of the case lower plate 29, the lower side of the cooling plate 39 is enclosed with a lower cover 37, and the lower cover 37 is aligned with the lowest ground height LH of the vehicle.

The cooling plate 39 configures a cooling passage through which a coolant flows with the case lower plate 29 so that by circulating the coolant through the cooling passage, it is possible to cool the battery 15 located on the upper side of the case lower plate 29.

Meanwhile, the lower cover 37 is configured to enclose and protect the lower side of the cooling plate 39.

A cover fastening bolt 43 penetrating the lower cover 37 and the case lower plate 29 is fastened to the vertical cross-sectional portion 23 of the case side portion 21, and the lower end portion of the head of the cover fastening bolt 43 is aligned with the lowest ground height LH.

That is, the case lower plate 29 and the lower cover 37 are coupled to the lower side of the vertical cross-sectional portion 23 of the case side portion 21 by the cover fastening bolt 43 in the overlapping state, the portion of the lower cover 37 fastened by the cover fastening bolts 43 is locally bent upward and pressed against the case lower plate 29, and the remaining portion of the lower cover 37 protrudes relatively downward to form a space that encloses the cooling plate 39. Thus, the head of the cover fastening bolt 43 and the lower end portion of the lower cover 37 is configured for being commonly aligned with the lowest ground height LH.

The lower end portion of the horizontal cross-sectional portion 25 of the case side portion 21 has a structure horizontally connected to an inclined connection portion 33 inclined downwardly from the vertical cross-sectional portion 23, and is aligned with the lowest ground height LH.

That is, the horizontal cross-sectional portion 25 of the case side portion 21 has a shape protruding in the horizontal direction from the vertical cross-sectional portion 23 as a whole, but has a shape extending slightly downward through the inclined connection portion 33 at the lower side so that the lower end portion of the horizontal cross-sectional portion 25 may be aligned with the lowest ground height LH.

Therefore, on the opposite sides of the cover fastening bolts 43, each of the lower end portion of the horizontal cross-sectional portion 25 and the lower cover 37 is aligned with the lowest ground height LH. Thus, it is possible to avoid that only the head of the cover fastening bolt 43 is intensively impacted by protrusions or scattering materials on the lower side of the vehicle and to disperse the impact.

A sleeve 45, which comes into contact with the lower side of the frame side member 7, is provided on the horizontal cross-sectional portion 25, and a case mounting bolt 47 penetrating the sleeve 45 is fastened to the frame side member 7.

That is, the horizontal cross-sectional portion 25 of the case side portion 21 is coupled to the frame side member 7 by the case mounting bolt 47, and the case mounting bolt 47 is provided to penetrate the sleeve 45 provided on the horizontal cross-sectional portion 25 and is fastened to the frame side member 7.

The sleeve 45 includes a protruding margin 49 protruding upwards from the frame side member 7 and an insertion support portion 51 inserted into the horizontal cross-sectional portion 25. The insertion support portion 51 is supported by a plurality of support walls spaced from each other and forming the horizontal cross-sectional portion 25.

Because the length of the protruding margin 49 of the sleeve 45 is relatively easily adjustable by replacing the sleeve 45 or grinding the upper end portion of the sleeve 45, the height at which the battery case 17 is substantially coupled to the frame side member 7 is easily adjustable, which makes it possible to easily adsorb the assembly tolerance of the battery case 17.

The protruding margin 49 of the sleeve 45 is 7 mm or more, and the insertion support portion 51 of the sleeve 45 is 15 mm or more.

The insertion support portion 51 of the sleeve 45 is a portion that determines the coupling rigidity between the sleeve 45 and the horizontal cross-sectional portion 25, and is 15 mm or more as described above to ensure the securely coupled state of the sleeve 45.

In the exemplary embodiment of the present disclosure, the lower end portion 25_L of the horizontal cross-sectional portion 25 includes a bolt passing hole 53 through which the head of the case mounting bolt 47 passes, and the plurality of support walls 55 of the horizontal cross-sectional portion 25 supporting the sleeve 45 are spaced from and in parallel to each other upwardly from the lower end portion 25_L of the horizontal cross-sectional portion 25.

Meanwhile, the transverse length of the horizontal cross-sectional portion 25 is provided in a range in which the external end portion of the horizontal cross-sectional portion 25 does not protrude beyond the external end portion of the frame side member 7 in the state in which the horizontal cross-sectional portion 25 is coupled to the lower side of the frame side member 7 by the case mounting bolt 47.

This allows the frame side member 7 to support and absorb an external impact earlier than the horizontal cross-sectional portion 25 when the external impact is applied. Consequently, the battery 15 accommodated in the battery case 17 is protected.

The transverse length of the horizontal cross-sectional portion 25 is set so that a head surrounding space including a width of 10 to 20 mm may be provided around the head of the case mounting bolt 47 in the state in which the horizontal cross-sectional portion 25 is coupled to the lower side of the frame side member 7 by the case mounting bolt 47.

It is preferable to determine the transverse length of the horizontal cross-sectional portion 25 due to the following reason: for the bolt mounting surface of the case mounting bolt 47 to be practically provided on the horizontal cross-sectional portion 25, the above-mentioned head surrounding space 25_S is required considering the curvature forming the horizontal cross-sectional portion 25, machining tolerance, and the like.

In the state in which the horizontal cross-sectional portion 25 is coupled to the lower side of the frame side member 7 by the case mounting bolt 47, a head clearance height 25_H of 5 to 10 mm is provided between the lower end portion of the horizontal cross-sectional portion 25 and the head of the case mounting bolt 47.

This makes it possible to effectively prevent the head of the case mounting bolt 47 from being damaged by protrusions or scattering materials on the road.

The head of the case mounting bolt 47 to have a height of, for example, 15 to 20 mm, and a diameter set to a level of 30 to 35 mm, and it is preferable to adjust the number of the case mounting bolts so that the load of the battery accommodated in the battery case 17 may be sufficiently handled.

Figure 6:
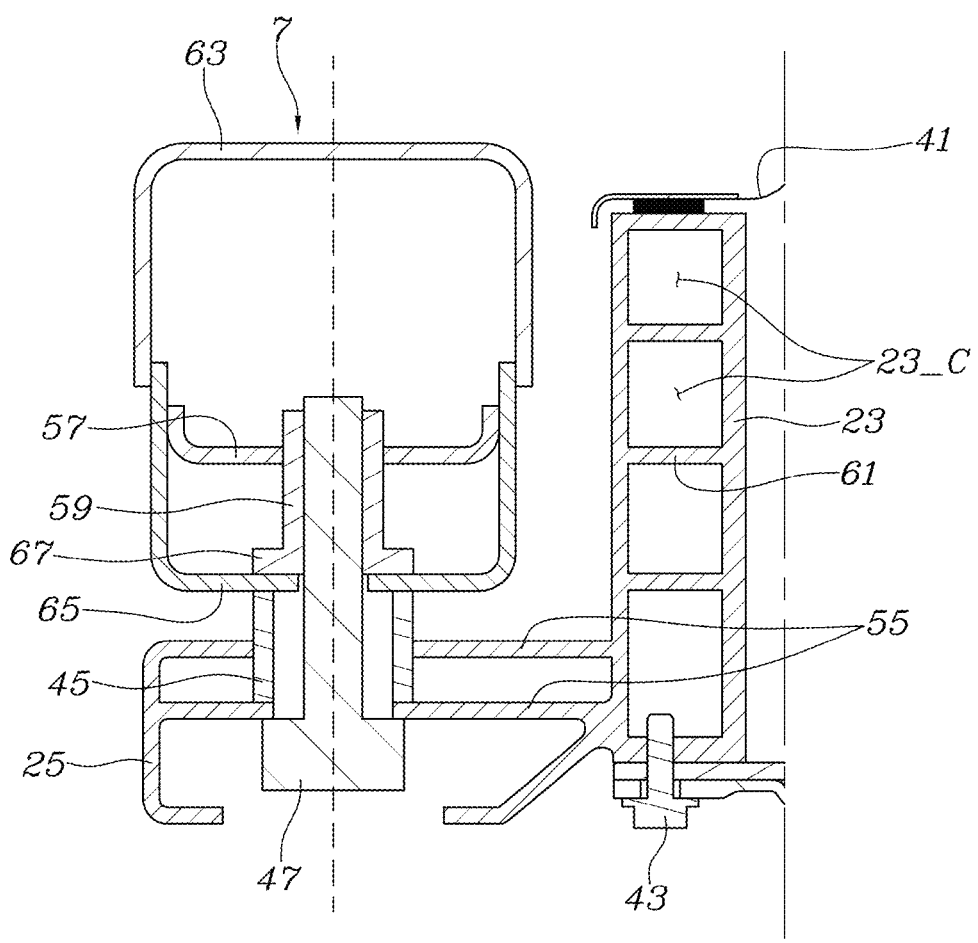
FIG. 6 is a cross-sectional view taken along line II-II of FIG. 1, in which a structure of a frame side member is illustrated.

FIG. 6 mainly illustrates the structure of the frame side member 7 forming the battery pack mounting structure of the vehicle of the present disclosure. The structure of the present exemplary embodiment includes: a frame side member 7 forming a chassis frame 3 and disposed on each of the opposite sides of the vehicle to extend in the front and rear direction thereof; a battery 15 disposed inside the frame side member 7 to overlap the frame side member in the horizontal direction thereof; and a battery case 17 enclosing the battery 15 and coupled to the frame side member 7. The cross section of the frame side member 7 provides a plurality of closed cross sections 7_C.

That is, the frame reinforcing panel 57 is provided inside the frame side member 7 to form the plurality of closed sections 7_C.

Furthermore, a rocker 59 to which the case mounting bolt 47 for coupling the battery case 17 to the frame side member 7 is fastened is provided to be supported by the frame reinforcing panel 57.

The frame reinforcing panel 57 is provided to provide a horizontal partition in the frame side member 7, and the rocker 59 is provided in a state of penetrating the frame reinforcing panel 57 and extending in the up and down direction so that the case mounting bolt 47 fastened through the frame side member 7 from the lower side is screwed to the rocker 59.

Accordingly, the frame side member 7 is configured to provide a more robust cross-sectional structure by the frame reinforcing panel 57 and the rocker 59, providing greater rigidity against an impact applied from the outside.

The rocker 59 is disposed in the center portion of the cross section of the frame side member 7.

That is, because the frame side members 7 are symmetrically disposed on opposite sides of the chassis frame 3, when the rocker 59 is disposed in the center portion of the cross section of each of the frame side members 7 as described above, it is possible to use the frame side members 7 on the opposite sides of the chassis frame 3 in common.

Of course, when it is difficult to use the frame side members 7 in common due to the structure of the vehicle, the rocker 59 may be provided at a position slightly away from the center portion of each frame side member 7.

It is preferable for the rocker 59 to be provided to a length so that the length of screwing with the case mounting bolt 47 is 9 mm or more, to secure strong coupling rigidity with the case mounting bolt 47.

The battery case 17 includes: an upper cover 41 enclosing the upper side of the battery 15; a case lower plate 29 supporting the lower side of the battery 15; a case side portion 21 provided between the upper cover 41 and the case lower plate 29 and forming the side surface of the battery case 17.

The case side portion 21 includes: a vertical cross-sectional portion 23 coupled between the case lower plate 29 and the upper cover 41 and including a cross section extending in the up and down direction thereof; and a horizontal cross-sectional portion 25 protruding and extending from the vertical cross-sectional portion 23 in the transverse direction of the vehicle and coupled to the lower side of the frame side member 7.

Furthermore, the horizontal cross-sectional portion 25 is provided with a sleeve 45 that comes into contact with the lower side of the frame side member 7, and the case mounting bolt 47 is provided to penetrate the sleeve 45 of the horizontal cross-sectional portion 25 and is fastened to the rocker 59 of the frame side member 7.

Meanwhile, a plurality of partition walls 61 are provided in the vertical cross-sectional portion 23 of the case side section 21 to partition the inside of the vertical cross-sectional portion 23 into a plurality of closed cross sections 23_C.

The plurality of partition walls 61 provided in the vertical cross-sectional portion 23 are spaced from and in parallel to each other in the up and down direction, and it is preferable to dispose one of the partition walls 61 to be aligned on the same horizontal plane as the frame reinforcing panel 57 of the frame side member 7.

That is, when one of the partition walls 61 of the vertical cross-sectional portion 23 is aligned on the same plane as the frame reinforcing panel 57 of the frame side member 7 as illustrated in FIG. 6, the partition wall 61 aligned with the frame reinforcing panel 57 of the vertical cross-sectional portion 23 is configured for supporting a load, which is transferred through the frame reinforcing panel 57 when the frame side member 7 is deformed by an external impact force and brought into contact with the vertical cross-sectional portion 23 of the case side portion 21. Therefore, it is possible to effectively suppress the continuous deformation of the frame side member 7.

A vehicle body side sill 19 is disposed outside the frame side member 7, side sill reinforcing panels 27 are provided inside the cross section of the vehicle body side sill 19 to provide one or more closed cross sections 19_C, and at least a portion of the portion in which the side sill reinforcing panels 27 are disposed in the horizontal direction is disposed to be aligned on the same horizontal plane as the frame reinforcing panel 57 of the frame side member 7.

In the instant case, the frame reinforcing panel 57 of the frame side member 7 may be configured to effectively suppress the deformation of the vehicle body side sill 19 from continuously progressing by supporting the load transmitted to the frame side member 7 via the side sill reinforcing panels 27 due to the deformation of the vehicle body side sill 19.

The configuration of the above-described embodiment of the present disclosure may be expressed as follows.

That is, the battery pack 1 mounting structure of the vehicle of the present disclosure includes: a frame side members 7 forming a chassis frame 3 and disposed on each of opposite sides of the vehicle to extend in the front and rear direction thereof; a battery 15 disposed inside the frame side member 7 to overlap the frame side member 7 in a horizontal direction thereof; and a case side portion 21 provided in an L-shaped cross section on a side surface of the battery case 17 enclosing the battery 15 and coupled to the lower side of the frame side member 7. A frame reinforcing panel 57 forming a partition wall in the horizontal direction is provided inside the frame side member 7.

The frame side member 7 forms a closed cross section including upper and lower horizontal portions 63 and 65, which are in parallel to the upper and lower sides of the frame reinforcing panel 57, respectively. The lower horizontal portion 65 and the frame reinforcing panel 57 have a structure in which a rocker 59 to which a case mounting bolt 47 fastened through the case side portion 21 is screwed is supported.

The rocker 59 is fixed in a state in which the lower flange 67 thereof is coupled to the upper side of the lower horizontal portion 65 of the frame side member 7 and the upper side thereof is provided to penetrate the frame reinforcing panel 57.

The case side portion 21 includes: a vertical cross-sectional portion 23 coupled to form a side surface of the battery case 17 with a cross section extending in the up and down direction between the upper cover 41 enclosing the upper side of the battery 15 and the case lower plate 29 supporting the lower side of the battery 15; and a horizontal cross-sectional portion 25 protruding and extending in the transverse direction of the vehicle from the vertical cross-sectional portion 23 and coupled to the frame side member 7.

The vertical cross-sectional portion 23 is provided with a plurality of partition walls 61 spaced from each other in the up and down direction, and one of the partition walls 61 is disposed to be aligned on the same horizontal plane as the frame reinforcing panel 57 of the frame side member 7.

A vehicle body side sill 19 is disposed outside the frame side member 7, a side sill reinforcing panel 27 is provided inside the cross section of the vehicle body side sill 19, at least a portion of the portion in which the side sill reinforcing panel 26 is horizontally disposed is disposed to be aligned on the same horizontal plane as one of the frame reinforcing panel 57 of the frame side member 7 and the partition walls 61 of the vertical cross-sectional portion 23.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery pack mounting structure of a vehicle, the battery pack mounting structure comprising:
a frame side member of a chassis frame provided so that an upper end portion thereof is located at a position spaced downward by a predetermined reference downward distance from a step height set in consideration of ease of boarding of passengers;
a battery case provided so that a battery accommodated in the battery case overlaps the frame side member in a horizontal direction thereof;
a case side portion forming a side surface of the battery case, coupled to a lower side of the frame side member, and including a lower end portion aligned with a lowest ground height of the vehicle; and
a case lower plate forming the battery case while supporting a lower side of the battery and disposed at a position spaced upwards from the lowest ground height.

2. The battery pack mounting structure of claim 1, wherein the predetermined reference downward distance corresponds to a sum of a thickness of a body floor in the vehicle, of which an upper end portion is aligned with the step height, and a vehicle body clearance formed between the body floor and the frame side member.

3. The battery pack mounting structure of claim 1, wherein the case side portion includes:
a vertical cross-sectional portion, which is a cross section extending in an up and down direction and forms the side surface of the battery case; and
a horizontal cross-sectional portion, which is a cross section extending from the vertical cross-sectional portion in a transverse direction of the vehicle to be perpendicular to the vertical cross-sectional portion and is coupled to the lower side of the frame side member.

4. The battery pack mounting structure of claim 3, wherein the case side portion is aligned with the lowest ground height at the lower end portion of the case side portion.

5. The battery pack mounting structure of claim 4, wherein a lower end portion of the horizontal cross-sectional portion of the case side portion has a structure horizontally connected to an inclined connection portion extending obliquely downwardly from a lower end portion of the vertical cross-sectional portion.

6. The battery pack mounting structure of claim 3, further including a sleeve provided on the horizontal cross-sectional portion and contacting with the lower side of the frame side member.

7. The battery pack mounting structure of claim 6, wherein the sleeve includes a protruding margin protruding upwards from the frame side member to provide a predetermined gap between the horizontal cross-sectional portion and the frame side member.

8. The battery pack mounting structure of claim 4, wherein the frame side member is provided so that a lower end portion of the frame side member is located at a position obtained by adding the lowest ground height and a height of the horizontal cross-sectional portion of the case side portion from the ground.

9. The battery pack mounting structure of claim 1, wherein the frame side member includes a frame recess in which a portion to which the case side portion is coupled is locally recessed upward in a longitudinal direction of the vehicle.

10. The battery pack mounting structure of claim 1, wherein a vehicle body side sill of a vehicle body provided on an upper side of the frame side member is aligned with the lowest ground height at a lower end portion thereof.

11. The battery pack mounting structure of claim 10, further including
side sill reinforcing panels provided inside a cross section of the vehicle body side sill.

12. The battery pack mounting structure of claim 1,
wherein the battery case includes a lower cover on a lower side of the case lower plate, and
wherein the lower cover is aligned with the lowest ground height.

13. A battery pack mounting structure of a vehicle, the battery pack mounting structure comprising:
a frame side member of a chassis frame provided so that an upper end portion of the frame side member is located at a position spaced downward by a predetermined reference downward distance from a step height of the vehicle and a lower end portion of the frame side member is located at a position spaced upward by a predetermined reference upward distance from a lowest ground height of the vehicle;
a battery disposed to overlap the frame side member in a horizontal direction; and
a battery case enclosing the battery, mounted on the frame side member, and including a lower end portion aligned with the lowest ground height.

14. The battery pack mounting structure of claim 13, wherein the battery case includes:
a case lower plate supporting a lower side of the battery;
a cooling plate provided on a lower side of the case lower plate;
a lower cover enclosing a lower side of the cooling plate;
an upper cover enclosing an upper side of the battery; and
a case side portion coupled between the case lower plate and the upper cover and forming a side surface of the battery case.

15. The battery pack mounting structure of claim 14, wherein the lower cover of the battery case is aligned with the lowest ground height.

16. The battery pack mounting structure of claim 14, wherein the case side portion includes:
a vertical cross-sectional portion provided between the case lower plate and the upper cover to have a cross-sectional shape extending in an up and down direction thereof; and
a horizontal cross-sectional portion protruding from the vertical cross-sectional portion in a transverse direction of the vehicle.

17. The battery pack mounting structure of claim 16, wherein a lower end portion of the horizontal cross-section of the case side portion has a structure horizontally connected to an inclined connection portion inclined downwardly from the vertical cross-sectional portion, and is aligned with the lowest ground height.

18. The battery pack mounting structure of claim 16, wherein the predetermined reference upward distance is provided by a height of the horizontal cross-sectional portion of the case side portion.

19. The battery pack mounting structure of claim 18, wherein the predetermined reference downward distance corresponds to a sum of a thickness of a body floor in the vehicle, of which an upper end portion is aligned with the step height, and a vehicle body clearance formed between the body floor and the frame side member.

20. The battery pack mounting structure of claim 14,
wherein the frame side member extends in a longitudinal direction of the vehicle, and
wherein a lower side of a portion to which the case side portion of the battery case is coupled is recessed upward to provide a frame recess, so that the lower end portion of the case side portion of the battery case coupled to the frame recess is configured to be aligned with the lowest ground height.

* * * * *